3,055,851
COATING COMPOSITION COMPRISING METHYL METHACRYLATE COPOLYMER AND NITROCELLULOSE
James J. Sanderson, Lansdowne, Pa., assignor to E. I. du Pont de Nemours and Company, Wilmington, Del., a corporation of Delaware
No Drawing. Filed May 11, 1960, Ser. No. 28,246
6 Claims. (Cl. 260—17)

This invention relates to coating compositions and more particularly to coating compositions containing nitrocellulose and at least one of a specific class of copolymers of methyl methacrylate.

Methyl methacrylate lacquers, that is, coating compositions containing solvents and, as the principal film-forming materials, polymers predominately of methyl methacrylate have found wide use in recent years because they can be applied to substrates and dried to form films and coatings which have outstanding durability and gloss retention. One of the problems associated with methyl methacrylate lacquers is crazing. "Crazing" refers to a multiplicity of interconnecting cracks which appear in dried methyl methacrylate lacquer coatings when they come in contact with solvents, for example, when blemishes in dried methyl methacrylate coatings are refinished. This problem is particularly important, for example, in automobile assembly lines where coated parts are assembled and, during assembly, the coatings may be bumped, scratched or otherwise blemished.

Prior attempts to modify methyl methacrylate lacquers to solve the aforementioned crazing problem have led to further problems. For example, additives such as large portions of plasticizer reduce crazing but increase the thermoplasticity of dried methyl methacrylate lacquers; thus, for example, on hot days if objects are placed on such dried coatings, an imprint is left therein. Also, the more thermoplastic a methyl methacrylate coating becomes, the more subject it becomes to soiling and scratching. Other additives reduce crazing but also reduce the unbuffed gloss of the methyl methacrylate lacquer coatings, thus necessitating considerable buffing to bring out the inherent gloss of the coatings.

Another serious problem encountered heretofore in attempts to reduce crazing of methyl methacrylate lacquers without adversely altering the other properties thereof is recoat spotting. Conventionally, when blemishes in methyl methacrylate lacquers are refinished, the spot to be refinished is first sanded. Next, the refinish coating is applied to the sanded spot. Finally, solvent is sprayed around the edges of the refinished spot to blend the refinish coating with the original coating. With many modified methyl methacrylate lacquers, the solvent used in the aforementioned refinishing procedure often causes a gray or light colored ring in the original coating around the refinished spot. "Recoat spotting" as used herein refers to this discoloration in a dried methyl methacrylate lacquer coating adjacent an area where a second coating of such a lacquer is applied thereover. Recoat spotting is not only important where blemishes are refinished, but also generally where adjacent areas of a surface are coated at different times and the two coatings must be blended to obscure the juncture therebetween.

This invention provides improved methyl methacrylate lacquers which yield coatings which have an excellent balance of craze resistance and freedom from objectionable thermoplasticity, yet do not exhibit recoat spotting. In addition, the lacquers of this invention have the excellent durability and gloss retention.

The coating compositions of this invention comprise solvent and, as essential film-forming materials, (A) 100 parts by weight of at least one copolymer of (1) about from 95 to 70, and preferably 90 to 80 parts by weight of methyl methacrylate and (2) about from 5 to 30, and preferably 10 to 20 parts by weight of at least one ester of methacrylic acid with a 10 to 22 carbon-atom alkanol and (B) about from 5 to 30, and preferably 10 to 20 parts by weight of lacquer-grade nitrocellulose.

The first essential polymeric constituent of the compositions of this invention is the aforementioned copolymer of methyl methacrylate and at least one ester of methacrylic acid with a 10 to 22 carbon-atom alkanol. Examples of such esters of methacrylic acid are decyl methacrylate, hendecanyl methacrylate, lauryl methacrylate, tridecanyl methacrylate, myristyl methacrylate, pentadecanyl methacrylate, palmityl methacrylate, stearyl methacrylate, arachidyl methacrylate, behenyl methacrylate, 10-methyl hendecanyl methacrylate, 2-ethyl lauryl methacrylate and mixture thereof. Minor portions of other polymerizable materials, for example, methacrylic acid or other esters thereof can also be polymerized with the essential constituents of the copolymers to vary the properties thereof in particular applications. Copolymers of methyl methacrylate with 12 to 18 carbon-atom esters of methacrylic acid are particularly preferred because such copolymers yield compositions having an optimum balance of properties characteristic of the products of this invention.

As mentioned above, the essential copolymer constituent of the compositions of this invention contains about from 5 to 30, and preferably from 10 to 20 parts by weight of an ester of methacrylic acid with a 10 to 22 carbon-atom alkanol and 95 to 70, and preferably 90 to 80 parts by weight of methyl methacrylate. If substantially greater than 30 parts of the aforementioned esters are used in the copolymers, the compositions of this invention are objectionably thermoplastic. If substantially less than 5 parts of these esters are used, the resulting coating compositions do not have the craze resistance characteristic of the compositions of this invention.

The copolymers of methyl methacrylate and the aforementioned esters of methacrylic acid used in the compositions of this invention preferably have a relative viscosity of about from 1.117 to 1.196. Copolymers falling within this range of viscosity have a unique solubility and viscosity which makes it possible, for example, to spray thick, smooth lacquer topcoats thereof in a relatively few individual coatings. The term "relative viscosity" as used herein to specific a property of the copolymers is the value obtained by dividing the efflux time of a solution (A) of the copolymer by the efflux time of the solvent (B) used in the solution. The efflux time can be measured in accordance with the procedure of A.S.T.M. D445–46T, Method B. Solution (A) is a solution of 0.25 gram of the copolymer being tested in 50 milliliters of ethylene dichloride and the solvent (B) is ethylene dichloride. The efflux times are determined at 25° C. in a standard apparatus currently marketed under the designation of Modified Ostwald Viscosimeter, Series 50.

The aforementioned copolymers used in the compositions of this invention can be prepared by the well known methods of polymerizing methyl methacrylate monomer in bulk, in solution or in granular form to produce products having the required relative viscosity. Preferably, the reaction is carried out in solution at temperatures of up to about 150° C. in the presence of a free radical catalyst such as, for example, benzoyl peroxide, azobis-(isobutyronitrile), ditertiarybutyl peroxide or the like.

The lacquer-grade nitrocellulose used in the coating compositions of this invention can be any of the wide variety of grades commonly employed in nitrocellulose lacquers. One of the most common characteristics used to define the nitrocellulose is viscosity. The most widely used grades have viscosities of ¼ to 5 seconds. These are the most useful grades for this invention, although mixtures containing small portions of grades having viscosities as high as 50 to 100 seconds can also be used. Nitrocellulose having a viscosity of ¼ to 1, and particularly ½ second is particularly preferred because such nitrocellulose yields coatings which have an optimum balance of properties including application properties. The ¼-second viscosity corresponds to about 50 centipoises when measured as a 12.2% solution in the solvent mixture defined in Formula A in A.S.T.M. D301-54T. On the same basis, 5 seconds corresponds to about 1800 centipoises, 50 seconds to about 18,000 centipoises and 100 seconds to about 38,000 centipoises. Coating compositions of this invention containing more than the aforementioned specified proportions of nitrocellulose exhibit objectionable recoat spotting. Coating compositions containing substantially less than the specified amounts of nitrocellulose in general yield coatings which are somewhat softer than those formed with the coating compositions of this invention and have poor solvent, and particularly gasoline resistance.

Examples of conventional solvents and diluents which can be used in the solution polymerization of the copolymers used in the compositions of this invention and as solvent for the coating compositions thereof are toluene, xylene, butyl acetate, butyl ether, acetone, methyl isobutyl ketone, butanol and other aliphatic, cycloaliphatic and aromatic hydrocarbons, esters, ethers, ketones and alcohols such as those which are conventionally used in methyl methacrylate lacquers.

Any of a wide variety of plasticizers conventionally used in methyl methacrylate can be used in the compositions of this invention in conventional amounts. Such plasticizers are, for example, benzyl butyl phthalate, dibutyl phthalate, triphenyl phosphate, 2-ethylhexyl benzyl phthalate, di(cyclohexyl)phthalate, butyl cyclohexyl phthalate and mixtures thereof. Benzyl butyl phthalate yields coatings having a particularly good over-all balance of properties and is preferred. Compositions containing about from 10 to 60%, and preferably about from 25 to 45% by weight of plasticizer based on the total weight of nitrocellulose and the aforementioned copolymers are usually used and are preferred.

Conventional pigments and extenders such as, for example, metal oxides, hydroxides, chromates, silicates, sulfides, sulfates, carbonates, organic dyes and lakes thereof, carbon blacks and metal flake pigments can be used in conventional amounts to pigment the compositions of this invention. Other conventional additives such as, for example, inhibitors, flow-control agents, minor proportions of other film-forming materials and the like also can be added to the compositions of this invention.

The various ingredients in the compositions of this invention can be brought together in accordance with conventional lacquer formulating techniques in any desired manner to form the finished coating compositions. Preferably, however, the compositions of this invention are formulated by milling the pigment, part of the plasticizer and at least part of the nitrocellulose to form a pasty or even solid mill base. The mill base or preferably a solution thereof is then blended with a solution of the copolymer and mixed with the remaining plasticizer and other additives. Finally, the resulting composition is diluted to suitable application viscosity, for example, to 10 to 20% solids, with one or more of the aforementioned solvents and applied.

Coating compositions of this invention can be applied by any of the conventional coating techniques such as, for example, flow, dip, spray, brush or roller coating. Although the compositions of this invention can be dried at room temperature, preferably they are air dried at elevated temperatures, for example, for about from 45 to 10 minutes at about from 65 to 120° C.

The coating compositions of this invention can be used, if desired, directly on bare substrates. Preferably, however, they are applied over conventional primers, sealers and the like. Because the coating compositions of this invention have improved adhesion, in some cases they can be applied without sealers. Coating compositions of this invention are particularly suitable in finishing systems for coating steel, especially steel automobile bodies. However, they can also be used in finishing systems for coating glass or ceramics, wood (when moderate baking temperatures are used) and metal such as aluminum, copper, magnesium and alloys thereof.

The dried coatings of the compositions of this invention are characterized by freedom from recoat spotting and an excellent balance of craze resistance and freedom from objectionable thermoplasticity in combination with outstanding durability and gloss retention. Coating compositions of this invention also have good gasoline resistance and improved adhesion as compared with conventional methyl methacrylate lacquers. Coating compositions of this invention find particular utility in coating articles which are mass produced and wherein the parts of the articles are precoated prior to assembly. The coating compositions of this invention now make it possible to blend refinished spots or other adjacent or overlapping areas without objectionable crazing or recoat spotting.

In the following examples, which illustrate this invention, parts and percentages are by weight unless otherwise specified.

EXAMPLE 1

*Preparation of Coating Composition*

The following materials are charged to a closed reaction vessel and heated under autogenous pressure at 85° C. for 16 hours:

| | Parts |
|---|---|
| Methyl methacrylate | 360 |
| Stearyl methacrylate | 40 |
| Toluene | 420 |
| Acetone | 180 |
| Benzoyl peroxide | 2.0 |

The resulting solution contains 39.0% of a copolymer of 90% of methyl methacrylate and 10% of stearyl methacrylate having a relative viscosity of about 1.14 to 1.16. The copolymer solution has a Gardner-Holdt viscosity of V+½.

A mill base is prepared from the following materials:

| | Parts |
|---|---|
| Nitrocellulose (½-second viscosity, wet with 25.5% water) | 404 |
| Carbon black pigment | 75 |
| Benzyl butyl phthalate | 209 |
| Water | 351 |
| Copper naphthenate | 9.20 |
| Indulin B dye | 1.68 |

The above materials are milled together until the water separates therefrom, then further milled at about 93° C. for about 20 minutes and finally dissolved in an equal-weight mixture of butyl acetate and acetone to yield a 19% solids mill-base solution.

A coating composition is prepared by thoroughly blending the following materials:

| | Parts |
|---|---|
| Copolymer solution described above | 162 |
| Mill base solution described above | 126 |
| Benzyl butyl phthalate plasticizer | 16.4 |
| Butyl acetate | 20 |
| Ethyl acetate | 20 |

The resulting composition contains 19 parts of nitrocellulose, 39 parts of benzyl butyl phthalate plasticizer and 4.7 parts of carbon black pigment per 100 parts of copolymer.

Evaluation of Coating Composition

Steel panels treated with conventional rust inhibitor ("Bonderite," a product of the Parker Rust Proof Company), are primed and sealed in the conventional manner. The prime coat contains 100 parts of a 52% soya-oil modified glyceryl phthalate resin as the film-forming material and pigment consisting of 39 parts of calcium carbonate, 9 parts of carbon black and 5 parts of zinc chromate. The sealer or undercoat, which is unpigmented, contains, as the principal film-forming material, an ammoniated copolymer of 97.8% of methyl methacrylate and 2.2% of glycidyl methacrylate. Finally, the coating composition of this invention described above is sprayed over the primed and sealed panels and baked for 30 minutes at about 115° C. to yield a topcoat about 2 mils thick.

Craze resistance of the coated panels is determined by aging the panels for 48 hours at about 65° C., chilling them in an atmosphere at about 15° C. and 40% relative humidity and finally recoating one-half of the panels with a coating composition of this example described above and coating the other half of the panels with a mixture of acetone, toluene and xylene. The panels show good craze resistance on both halves of the panels.

The thermoplasticity of the dried coatings is determined by measuring the print resistance thereof. This is done by laying a gauze over the dried coating and applying a pressure of 4 pounds per square inch to the gauze. After the samples have been held for 1 hour at 66° C., the pressure is removed and the impression, if any, of the gauze in the coating is noted. The panels are given a rating of between 2 and 10. With the rating of 2, the gauze cuts completely through the coatings. Ratings of 5 to 10 are acceptable and represent from only moderate marring to no marring by the gauze, respectively. The dried coatings described above have a print resistance of greater than 5. The coatings also have a Tukon hardness of 8.1 Knoop units and an excellent jet-black color.

The dried lacquer coatings have excellent resistance to recoat spotting. Resistance to recoat spotting is determined, by spraying or dropping solvent of the type used in methyl methacrylate lacquer on the dried coatings and noting any ring or white marring in the coating after the solvent has evaporated. A typical solvent is, for example, a solvent mixture of acetone, toluene, butanol, xylene and 2-ethoxyethyl acetate in a weight ratio of about 7:6:1:4:3, respectively. The dried coatings described above show no marring in this spotting test.

EXAMPLE 2

The following materials are charged to a closed reaction vessel and heated under autogenous pressure for 18 hours at 85° C.:

| | Parts |
|---|---|
| Methyl methacrylate | 427 |
| Lauryl methacrylate | 22 |
| Toluene | 385 |
| Acetone | 165 |
| Benzoyl peroxide | 2.4 |

The resulting reaction mixture is diluted to about 40% solids with a mixture of 70% of toluene and 30% of acetone to yield a solution having a Gardner-Holdt viscosity of X+½.

A mill base in prepared from the following materials:

| | Parts |
|---|---|
| Nitrocellulose (½-second viscosity wet with 30% water) | 239.2 |
| Indulin B dye | 2.24 |
| Copper naphthenate | 16.16 |
| Homopolymer of methyl methacrylate (40% solution in toluene and acetone) | 36.72 |
| Benzyl butyl phthalate plasticizer | 183.68 |
| Carbon black pigment | 110.8 |
| Water | 203.5 |

The above materials are milled until the water therefrom, then milled an additional 20 minutes at 93° C. and finally dissolved in an equal weight mix of butyl acetate and acetone to yield a 25% solids mill base solution.

A coating composition is prepared by mixing together the following materials:

| | Parts |
|---|---|
| Copolymer solution described above | 196 |
| Mill base solution described above | 80 |
| Benzyl butyl phthalate plasticizer | 20 |
| Butyl acetate | 100 |
| 2-ethoxyethyl acetate | 60 |

The resulting coating composition contains per, 100 parts of the copolymer of methyl methacrylate and lauryl methacrylate, 8.6 parts of nitrocellulose, 35 parts of benzyl butyl phthalate plasticizer and 5.8 parts of carbon black pigment.

The above coating composition is sprayed onto primed and sealed steel panels and dried as described in Example 1 to yield a dried coating having a hardness of 8.9 Knoop units, a print resistance of 10 and acceptable craze resistance.

The procedure described above is repeated except that a copolymer of 90% of methyl methacrylate and 10% of lauryl methacrylate is substituted for the copolymer of 95% of methyl methacrylate and 5% of lauryl methacrylate just described. The resulting coating composition when applied to primed and sealed steel panels and dried yields a coating having a hardness of 7.4 Knoop units, a print resistance of 7 and somewhat higher craze resistance than the first coating composition of this example described above. Both of the coating compositions of this example have good resistance to recoat spotting.

EXAMPLE 3

The following materials are charged to a closed reaction vessel and heated under autogenous pressure for 18 hours at 85° C.:

| | Parts |
|---|---|
| Methyl methacrylate | 382.4 |
| Lauryl methacrylate | 67.6 |
| Toluene | 385 |
| Acetone | 165 |
| Benzoyl peroxide | 2.4 |

The resulting reaction mixture containing a copolymer of 85% of methyl methacrylate and 15% of lauryl methacrylate is diluted with a mixture of 70% of toluene and 30% of acetone to yield a solution containing 38.6% solids and having a Gardner-Holdt viscosity of Q.

A coating composition is prepared by mixing together the following materials:

| | Parts |
|---|---|
| Copolymer solution described above | 179 |
| Nitrocellulose (½-second viscosity, 30% solution in acetone) | 13 |
| Mill base solution (same as Example 2) | 80 |
| Benzyl butyl phthalate plasticizer | 20 |
| Butyl acetate | 100 |
| 2-ethoxyethyl acetate | 60 |

The resulting coating composition contains 15 parts of nitrocellulose, 39 parts of benzyl butyl phthalate plasticizer and 6.3 parts of carbon black pigment per 100 parts by weight of copolymer. Dried coatings of this composition have a hardness of 6.3 Knoop units, a print resistance of 6 and excellent craze resistance. The coatings also have good resistance to recoat spotting.

If a copolymer of 85% of methyl methacrylate and 15% of 2-ethyl lauryl methacrylate having a relative viscosity of about 1.15 is substituted for the copolymer used in this example, substantially similar results are obtained.

charged to a closed reac-
autogenous pressure at 85°

| | Parts |
|---|---|
| | 352 |
| | 40 |
| | 8 |
| Acetone | 180 |
| Toluene | 420 |
| Benzoyl peroxide | 2.4 |

The resulting reaction mixture contains 38.6% solids and has a Gardner-Holdt viscosity of V+½.

A coating composition is prepared by blending together the following materials:

| | Parts |
|---|---|
| Copolymer solution described above | 157 |
| Nitrocellulose (½-second viscosity, 25% solution in equal weight mixture of butyl acetate and ethyl acetate) | 24 |
| Mill base solution (25.0% solution similar to that described in Example 1) | 58 |
| Triphenyl phosphate plasticizer | 14.3 |
| Benzyl butyl phthalate plasticizer | 8.0 |
| Butyl acetate | 42 |
| Ethyl acetate | 42 |

The resulting coating composition contains 18 parts of nitrocellulose, 47 parts of plasticizer and 3.5 parts of carbon black pigment per 100 parts of copolymer. When the coating composition described above is coated on primed and sealed steel panels as described in Example 1, the resulting product has acceptable print resistance, good craze resistance and good resistance to recoat spotting.

If 40 parts of titanium dioxide pigment are substituted for the carbon black pigment employed above a product with a similar combination of print resistance, craze resistance and resistance to recoat spotting is obtained.

I claim:
1. A coating composition comprising solvent and, as the essential film-forming materials, (A) 100 parts by weight of at least one copolymer of (1) about from 95 to 70 parts by weight of methyl methacrylate and (2) about from 5 to 30 parts by weight of at least one ester of methacrylic acid with a 10 to 22 carbon-atom alkanol and (B) about from 5 to 30 parts by weight of lacquer-grade nitrocellulose.

2. A coating composition comprising solvent and, as the essential film-forming materials, (A) 100 parts by weight of at least one copolymer of (1) about from 90 to 80 parts by weight of methyl methacrylate and (2) about from 10 to 20 parts by weight of at least one ester of methacrylic acid with a 10 to 22 carbon-atom alkanol and (B) about from 10 to 20 parts by weight of lacquer-grade nitrocellulose.

3. A coating composition which comprises solvent and, as the essential film-forming materials, (A) 100 parts by weight of at least one copolymer having a relative viscosity of about from 1.117 to 1.196 of (1) about from 90 to 80 parts by weight of methyl methacrylate and (2) about from 10 to 20 parts by weight of at least one ester of methacrylic acid with a 12 to 18 carbon-atom alkanol and (B) about from 10 to 20 parts by weight of lacquer-grade nitrocellulose.

4. A coating composition of claim 3 wherein said copolymer is a copolymer of methyl methacrylate and stearyl methacrylate.

5. A coating composition of claim 3 wherein said copolymer is the copolymer of methyl methacrylate and lauryl methacrylate.

6. A coating composition of claim 3 containing carbon black pigment.

References Cited in the file of this patent
UNITED STATES PATENTS

| 2,860,110 | Godshalk | Nov. 11, 1958 |
| 2,907,722 | Staicopoulos | Oct. 6, 1959 |

FOREIGN PATENTS

| 478,309 | Great Britain | July 13, 1937 |